United States Patent [19]
Togino

[11] Patent Number: 5,768,039
[45] Date of Patent: Jun. 16, 1998

[54] HEAD-MOUNTED IMAGE DISPLAY APPARATUS

[75] Inventor: Takayoshi Togino, Koganei, Japan

[73] Assignee: Olympus Optical Co., Ltd., Tokyo, Japan

[21] Appl. No.: 549,997

[22] Filed: Oct. 30, 1995

Related U.S. Application Data

[63] Continuation of Ser. No. 326,951, Oct. 21, 1994, Pat. No. 5,517,366.

[30] Foreign Application Priority Data

Oct. 22, 1993 [JP] Japan ................... 5-264828

[51] Int. Cl.$^6$ .................... G02B 5/08; G02B 7/182; G02B 5/10; G02B 17/00
[52] U.S. Cl. ............... 359/850; 359/851; 359/852; 359/853; 359/364; 359/365; 359/366; 359/726; 359/727; 359/728; 359/839
[58] Field of Search ................. 359/850, 851, 359/852, 853, 364, 365, 366, 726, 727, 728, 839

[56] References Cited

U.S. PATENT DOCUMENTS

| | | | |
|---|---|---|---|
| Re. 27,356 | 5/1972 | La Russa | 56/95 |
| 3,443,858 | 5/1969 | La Russa | 359/494 |
| 3,825,322 | 7/1974 | Mast | 359/727 |
| 3,940,203 | 2/1976 | La Russa | 359/15 |
| 4,007,979 | 2/1977 | Coblitz | 359/493 |
| 4,163,542 | 8/1979 | La Russa | 359/15 |
| 4,322,135 | 3/1982 | Freeman | 359/643 |
| 4,429,956 | 2/1984 | Herbert | 359/727 |
| 4,874,214 | 10/1989 | Cheysson et al. | 359/15 |
| 5,452,126 | 9/1995 | Johnson | 359/726 |

FOREIGN PATENT DOCUMENTS

0583116A2  2/1994  European Pat. Off. .

OTHER PUBLICATIONS

Epstein et al., Projection Television, Jun. 1995, pp. 444–445.

*Primary Examiner*—Paul M. Dzierzynski
*Assistant Examiner*—Mohammad Y. Sikder
*Attorney, Agent, or Firm*—Cushman Darby & Cushman IP Group of Pillsbury Madison & Sutro LLP

[57] ABSTRACT

A head-mounted image display apparatus (HMD) including an ocular optical system, which has an F-number of 1.5 to 3 and enables a flat and clear image to be observed at a view angle of up to 60° or more with substantially no aberration. The HMD has at least two, surfaces and each having a concave surface directed toward the pupil. The two surfaces are disposed so that light rays from an image display device are reflected by the first surface, and the reflected light rays are reflected by the second surface and pass through the first surface to enter an observer's eyeball.

8 Claims, 17 Drawing Sheets

FIG. 11
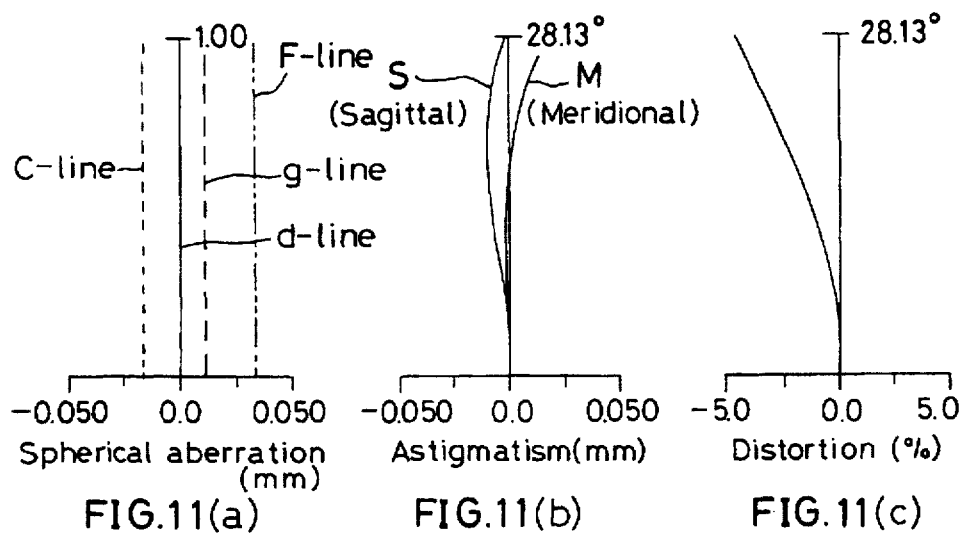
FIG.11(a)    FIG.11(b)    FIG.11(c)
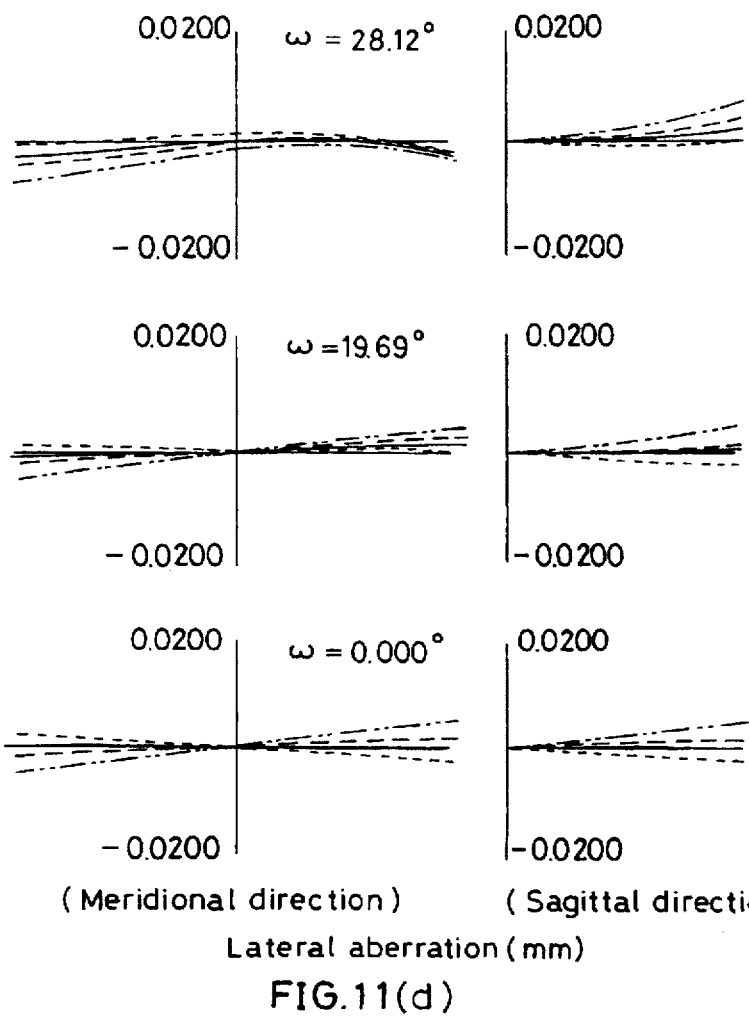
FIG.11(d)

FIG. 12
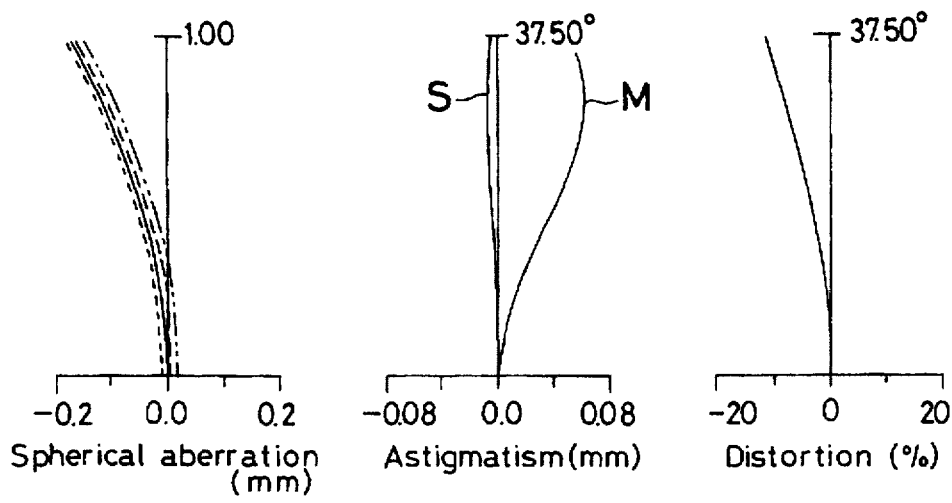
Spherical aberration (mm)
FIG. 12(a)
Astigmatism (mm)
FIG. 12(b)
Distortion (%)
FIG. 12(c)
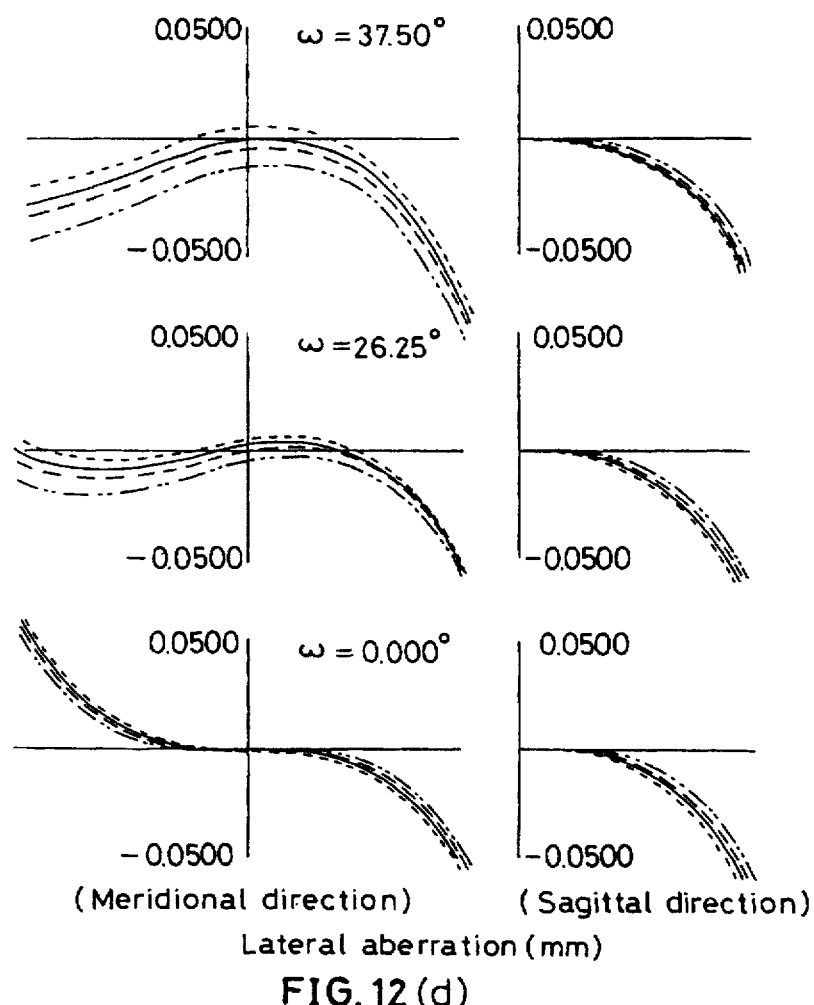
(Meridional direction) (Sagittal direction)
Lateral aberration (mm)
FIG. 12(d)

FIG. 13(a) Spherical aberration (mm)
FIG. 13(b) Astigmatism (mm)
FIG. 13(c) Distortion (%)

FIG. 13(d) Lateral aberration (mm)

FIG. 14
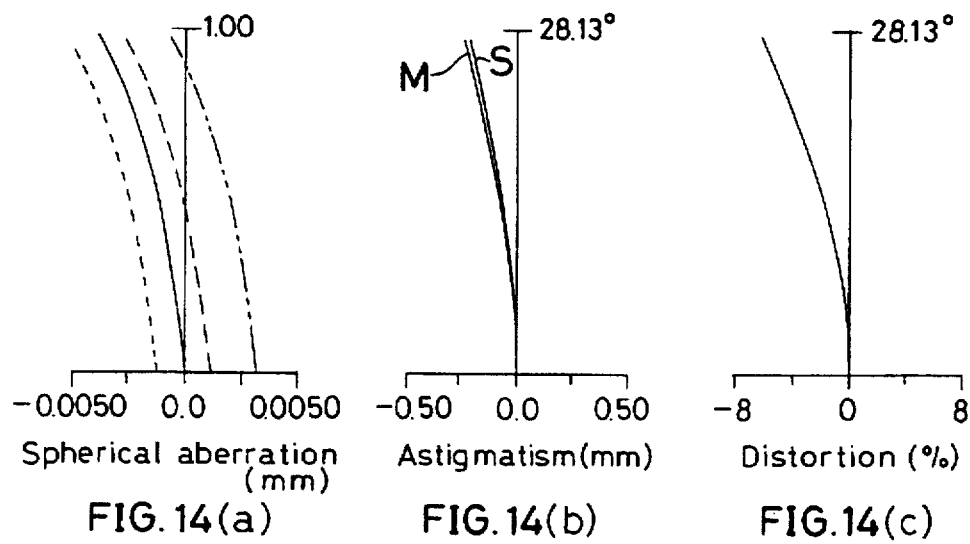
Spherical aberration (mm)  Astigmatism (mm)  Distortion (%)
FIG. 14(a)                  FIG. 14(b)        FIG. 14(c)
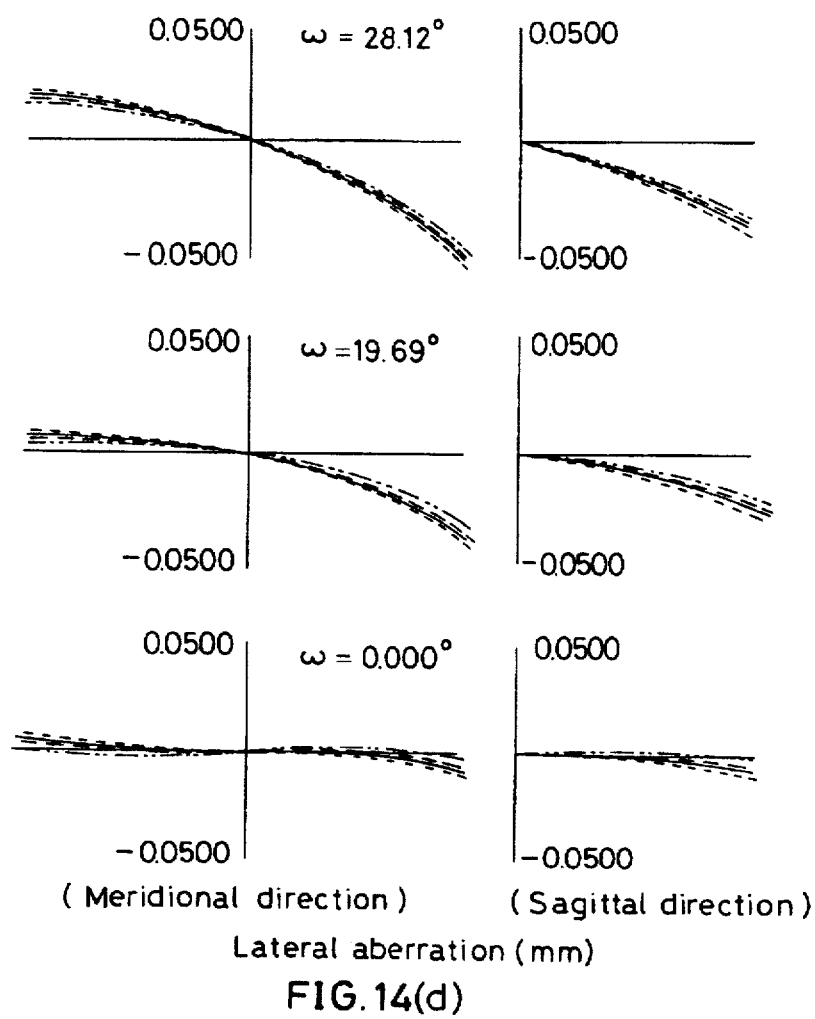
(Meridional direction)   (Sagittal direction)
Lateral aberration (mm)
FIG. 14(d)

FIG. 15
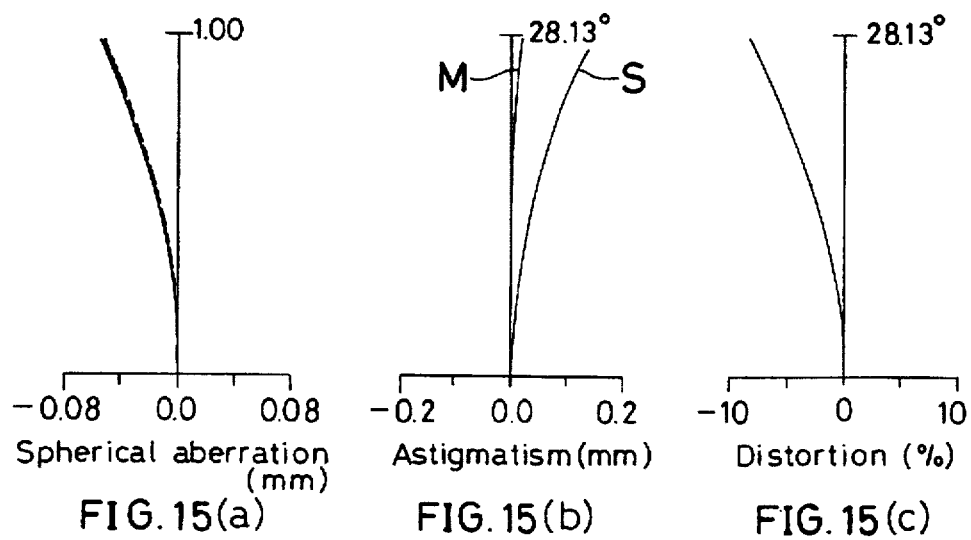
FIG.15(a) Spherical aberration (mm)
FIG.15(b) Astigmatism (mm)
FIG.15(c) Distortion (%)
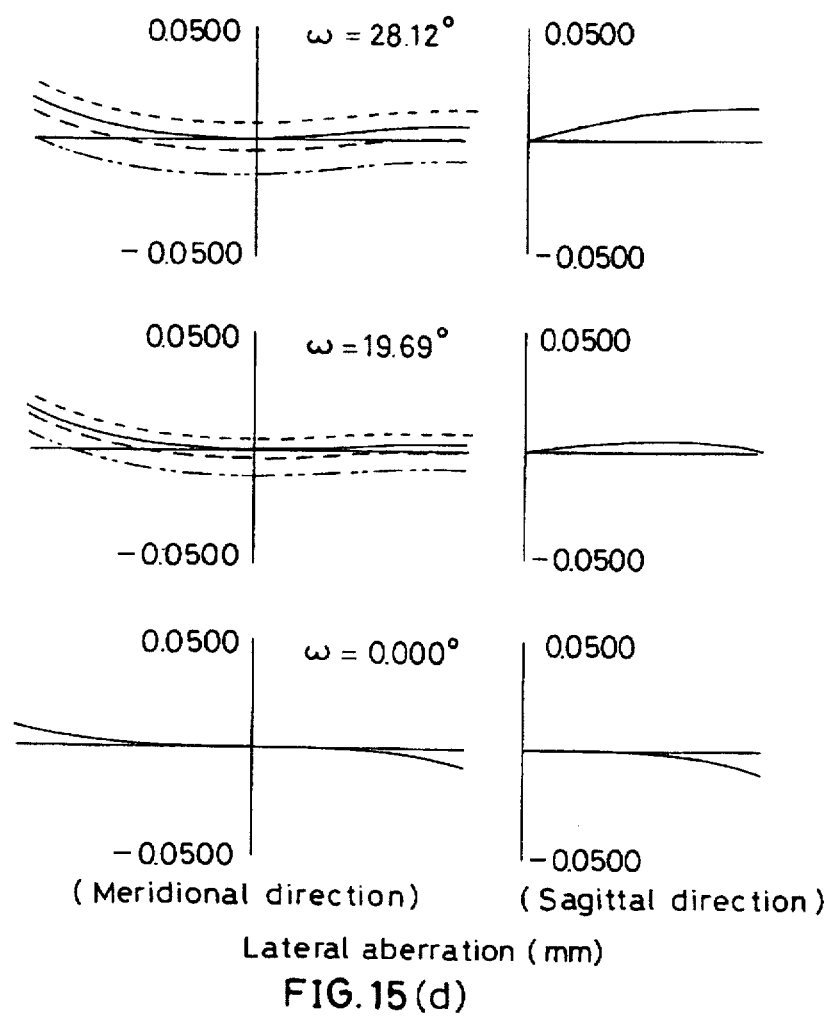
Lateral aberration (mm)
FIG.15(d)

FIG. 16
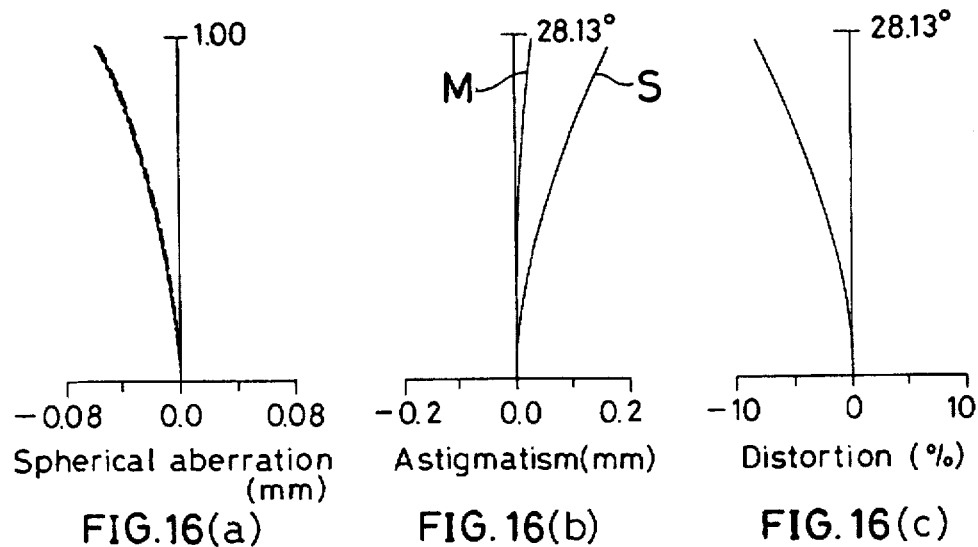
FIG.16(a) Spherical aberration (mm)
FIG.16(b) Astigmatism(mm)
FIG.16(c) Distortion (%)
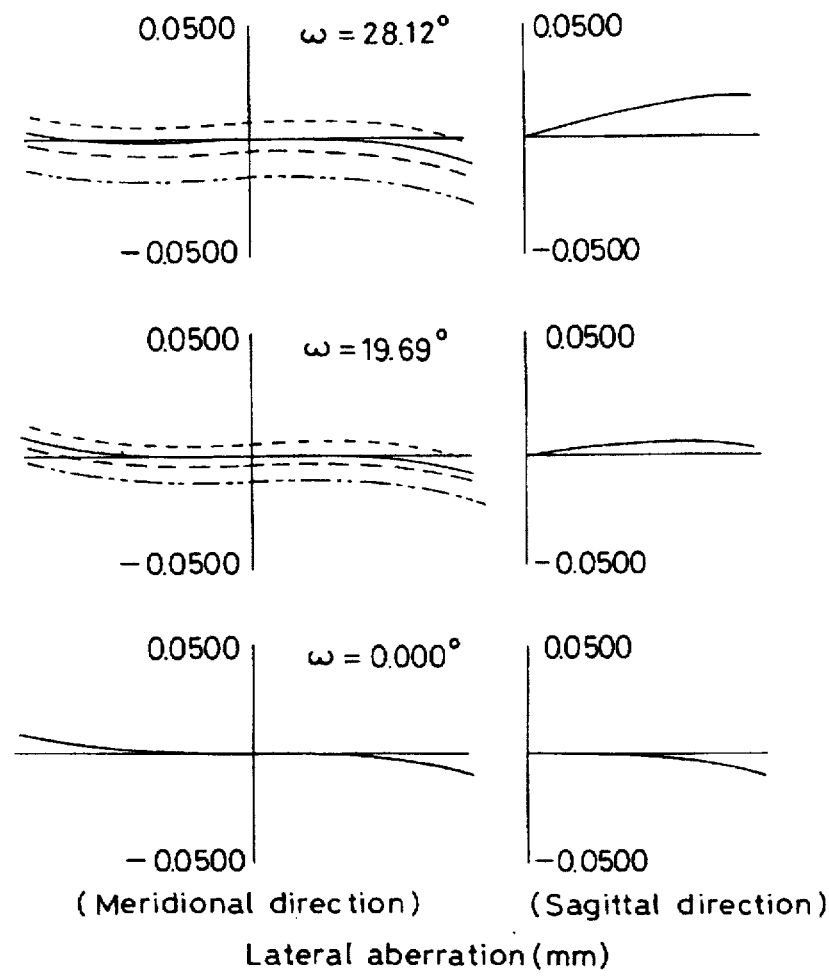
(Meridional direction)  (Sagittal direction)
Lateral aberration(mm)
FIG.16(d)

FIG. 17
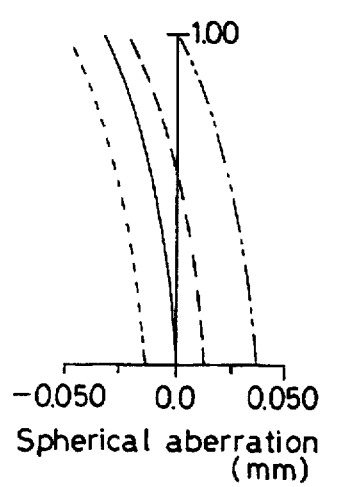
FIG.17(a) Spherical aberration (mm)
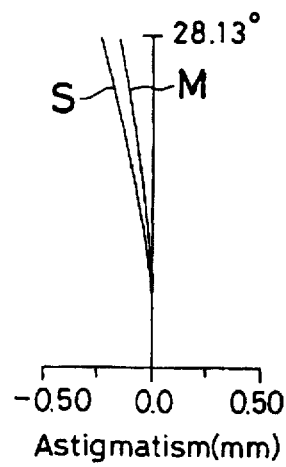
FIG.17(b) Astigmatism (mm)
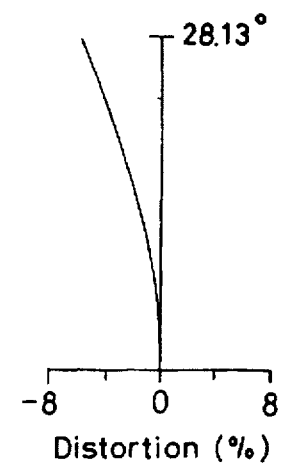
FIG.17(c) Distortion (%)
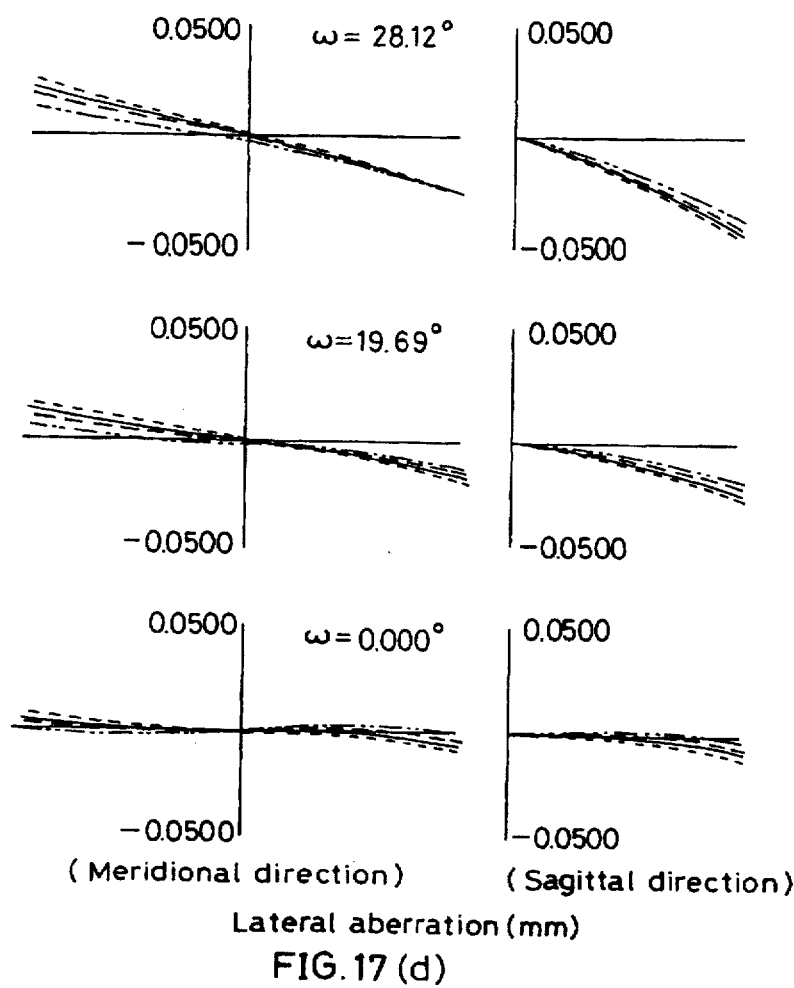
(Meridional direction) (Sagittal direction)
Lateral aberration (mm)
FIG. 17 (d)

FIG. 18
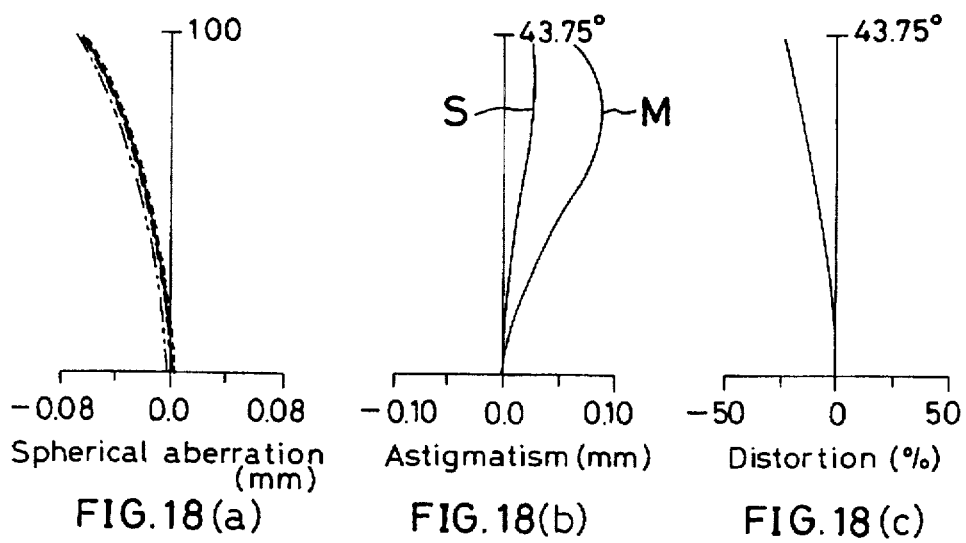
FIG.18(a)　　FIG.18(b)　　FIG.18(c)
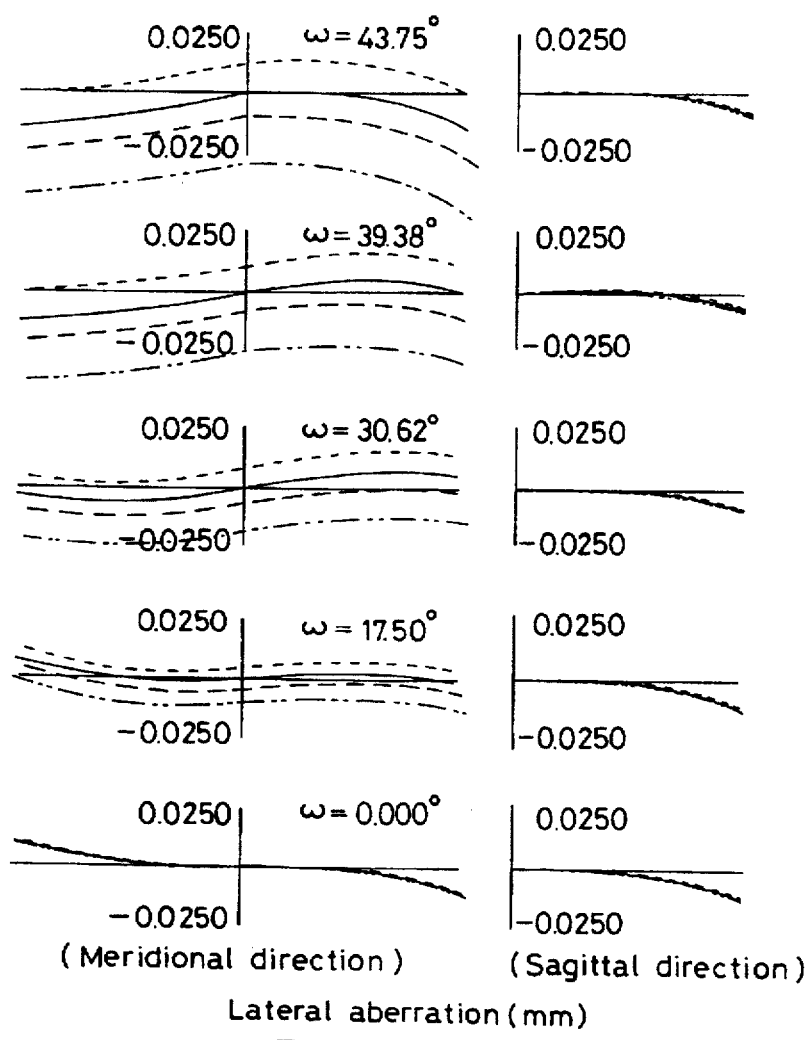
FIG.18(d)

FIG. 19
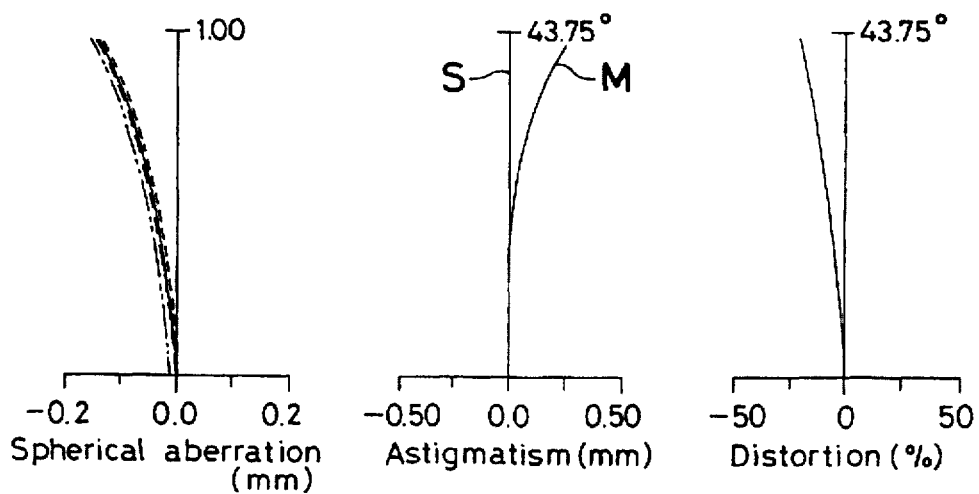
FIG. 19(a)    FIG. 19(b)    FIG. 19(c)
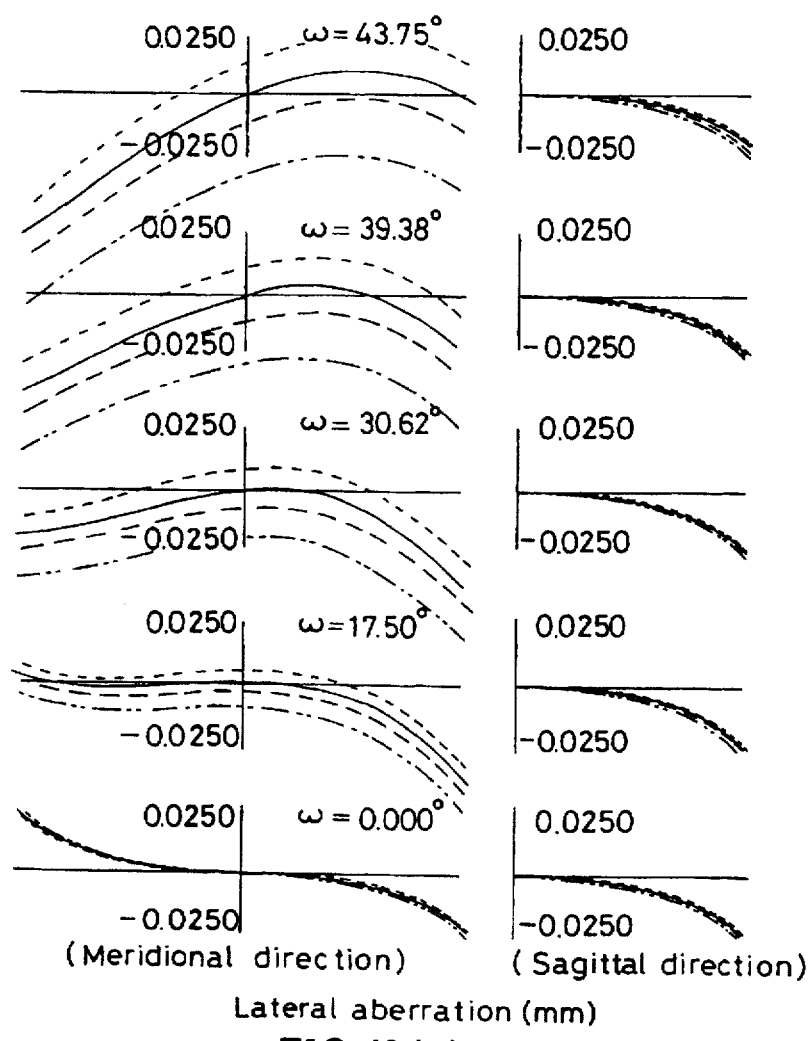
FIG. 19(d)

FIG. 20
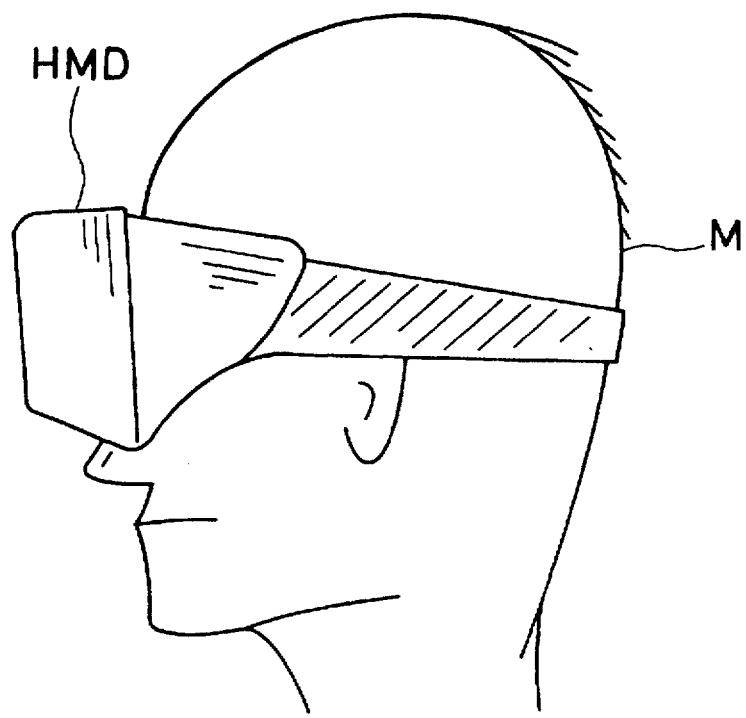
FIG. 20(a)
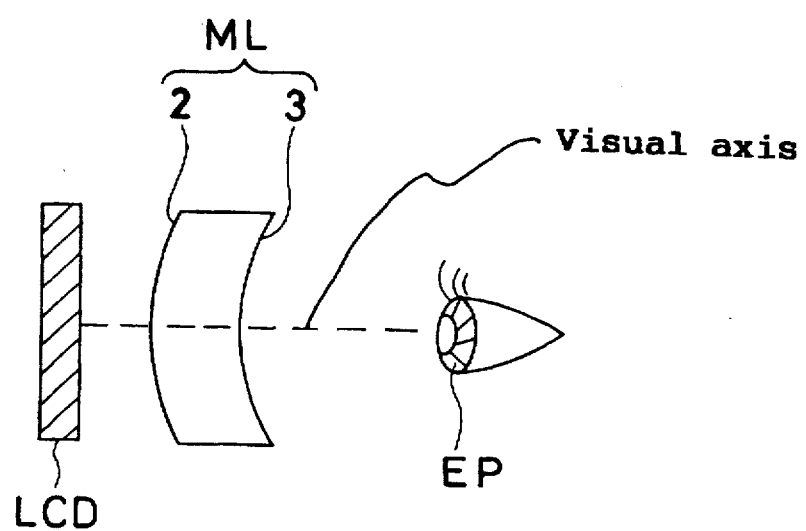
FIG. 20(b)

FIG. 23
FIG. 23(a)
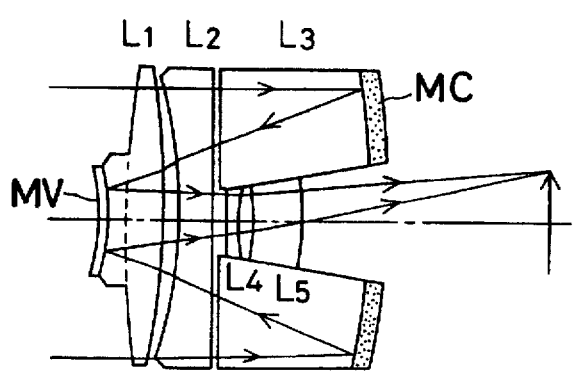
FIG. 23(b)
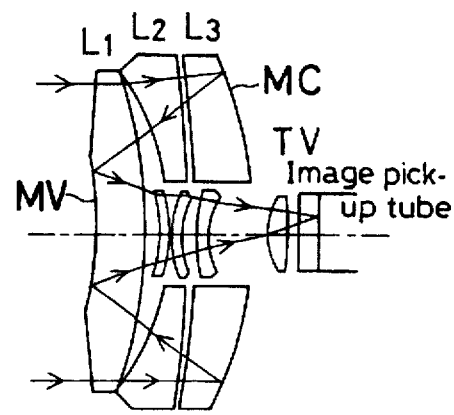

HEAD-MOUNTED IMAGE DISPLAY APPARATUS

This application is a continuation of Ser. No. 08/326,951, filed on Oct. 21, 1994, U.S. Pat. No. 5,517,366.

BACKGROUND OF THE INVENTION

The present invention relates to an optical system which is usable as an ocular optical system. More particularly, the present invention relates to an optical system which has a wide angle of view and high resolution.

In general, a Schmidt system, which is well known as an objective for astronomical telescopes, is arranged as shown in the sectional view of FIG. 21. That is, an aspherical lens LA which is close to a plane-parallel plate is placed at the center of curvature of a concave mirror MC to correct spherical aberration, and a diaphragm D is disposed at the center of curvature to correct coma and astigmatism.

Optical systems, which are represented by the above Schmidt system, are free from coma and astigmatism by virtue of the diaphragm D disposed at the center of curvature of the concave mirror MC. However, since the curvature of field cannot be corrected, a large field curvature occurs. In addition, since the image position lies in front of the concave mirror MC, if a film F or a CCD, for example, is disposed on the image surface, the bundle of incident rays is eclipsed.

It should be noted that U.S. Reissued Pat. No. 27,356 discloses an ocular optical system which, as shown in FIG. 22, uses a semitransparent concave mirror 6 and a semitransparent plane mirror 16 to project an object surface 62 in a distance, and which adopts an arrangement wherein the field curvature produced by the semitransparent concave mirror 6 is corrected by curving the object surface 62. It should be noted that reference numeral 66 in FIG. 22 denotes an exit pupil.

To solve the above-described problems, one type of conventional optical system uses a convex mirror MV, as shown in the sectional view of FIG. 23(a) or 23(b). In this type of optical system, the image surface can be placed behind the concave mirror MC by the convex mirror MV.

However, these conventional optical systems are designed for telescopes or reflecting telephoto lenses, and most of them have a long focal length and a narrow angle of view. There has heretofore been no optical system having a wide angle of view and a small F-number.

Lens systems of wide view angle which are composed of ordinary refracting lenses have the disadvantage that the number of constituent lenses increases and the structure becomes complicated.

SUMMARY OF THE INVENTION

In view of the above-described problems of the related art, it is an object of the present invention to provide a head-mounted image display apparatus (HMD) including an ocular optical system, which has an F-number of 1.5 to 3 and enables a flat and clear image to be observed at a view angle of up to 60° or more with substantially no aberration.

To attain the above-described object, the present invention provides a head-mounted image display apparatus including a device for displaying an image, and an ocular optical system for leading the image to an observer's eyeball. The ocular optical system has, in order from the observer's eyeball side, a first surface having a concave surface directed toward the observer's eyeball side, and a second surface having a concave surface directed toward the observer's eyeball side, with a medium having a refractive index n larger than 1 (n>1) put between the first and second surfaces. The image display device has an image surface directed toward at least either one of intersections between an optical axis extending from the observer's eyeball and the first surface and between the optical axis and the second surface, and the image display device is provided in front of the observer's face. The image display device and the ocular optical system are formed so that a bundle of light rays emitted from the image display device is reflected by the first surface, and the reflected light ray bundle is reflected by the second surface and then passes through the first surface to enter the observer's eyeball.

In addition, the present invention provides a head-mounted image display apparatus including a device for displaying an image, and an ocular optical system for leading the image to an observer's eyeball. The ocular optical system has, in order from the observer's eyeball side, a first surface having a concave surface directed toward the observer's eyeball side, and a second surface having a concave surface directed toward the observer's eyeball side, with a medium having a refractive index n larger than 1 (n>1) put between the first and second surfaces. An optical element having a refractive index n larger than 1 (n>1) is provided at the second surface side of the ocular optical system. The image display device is provided in front of the observer's face. The image display device and the ocular optical system are formed so that a bundle of light rays emitted from the image display device is reflected by the first surface, and the reflected light ray bundle is reflected by the second surface and then passes through the first surface to enter the observer's eyeball.

In this case, when an extension of an optical axis which is reflected by the second surface and then passes through the first surface to enter the observer's eyeball is defined as a visual axis, it is preferable for the optical element to have a configuration in which the thickness of a medium increases toward at least one end thereof from the visual axis.

The optical element may be cemented to the second surface of the ocular optical system.

Further, a lens of positive power may be provided at a position closer to the observer's eyeball than the first surface of the ocular optical system.

The lens of positive power may be cemented to the first surface of the ocular optical system.

Further, it is preferable to satisfy the following condition:

$$0.5 < |R_1/R_2| < 1.8 \qquad (2)$$

where $R_1$ is the radius of curvature of the first surface, and $R_2$ is the radius of curvature of the second surface.

It is also preferable to satisfy the following condition:

$$0.4 < |(D_1+D_2)/R_2| < 1.7 \qquad (3)$$

where $R_2$ is the radius of curvature of the second surface; $D_1$ is the distance from the observer's eyeball position to the first surface; and $D_2$ is the distance (along the visual axis) from the first surface to the second surface.

It is also preferable to satisfy the following condition:

$$1 < |(R_1+D_2)/R_2| < 1.8 \qquad (4)$$

where $R_1$ is the radius of curvature of the first surface; $R_2$ is the radius of curvature of the second surface; and $D_2$ is the distance from the first surface to the second surface along the observer's visual axis.

Further, it is preferable to satisfy the following condition:

$$|D_1/R_1|<1.5 \quad (5)$$

where $R_1$ is the radius of curvature of the first surface, and $D_1$ is the distance from the observer's eyeball to the first surface.

The reason for adopting the above-described arrangements in the present invention and the functions thereof will be explained below.

The ocular optical system that is used in the HMD of the present invention will be explained below.

FIG. 1 is a view used to explain the basic arrangement of the optical system according to the present invention and the reason why the amount of aberration occurring in the optical system is small. In FIG. 1, reference numeral 1 denotes a pupil position, 2 a first surface, 3 a second surface, and 4 an image surface. FIG. 1 illustrates an optical ray trace of an arrangement in which the center of curvature of the first surface 2 and that of the second surface 3 are perfectly coincident with the pupil position 1. It will be understood from the figure that since the pupil position 1 and the centers of curvature of the first and second surfaces 2 and 3 are coincident with each other, axial rays and off-axis rays are rotationally symmetric with respect to the pupil position 1. This means that neither astigmatism nor coma, which are off-axis aberrations, occurs. In addition, since all the surfaces that have refracting power are reflecting surfaces, no chromatic aberration occurs either, in theory. In a case where the F-number is 2 or less, the occurrence of spherical aberration can also be virtually ignored.

However, the image surface formed by the second surface 3 is a spherical surface centered at the pupil position 1. Therefore, field curvature can occur. The present invention has succeeded in effectively correcting the field curvature in the optical system, in which the amount of aberration produced is exceedingly small, as has been described above. The scheme of correcting the field curvature according to the present invention will be explained below.

Although the optical system of U.S. Reissued Pat. No. 27,356, shown in FIG. 22, is used as an ocular optical system, it will be explained in the following description of the present invention by changing the denotation such that reference numeral 66 denotes a pupil plane, and 62 an image surface for the sake of convenience. In the optical system shown in FIG. 22, the field curvature produced by the concave mirror 6 is corrected by curving the image surface 62. In general, however, a curved image surface is not suitable for an arrangement in which an image display device, e.g., a liquid crystal display device (LCD) or a CRT display, is disposed. Therefore in the present invention, the optical system is arranged such that the field curvature produced by the concave mirror 3 is corrected by the convex mirror 2, as shown in FIG. 1.

That is, Petzval sum PS, which is generally regarded as indicating an amount of field curvature produced, is expressed by $$PS=\Sigma(1/n\cdot f) \quad (1)$$

where n is the refractive index, and f is the focal length of the surface.

In the case of the optical system of U.S. Reissued Pat. No. 27,356, which is equivalent to an arrangement in which the convex mirror 2 in the present invention is replaced by the plane mirror 16, Petzval sum occurring when rays are reflected by the concave mirror 6 is not corrected at all because the focal length of the plane mirror 16 is infinity.

Therefore, in the present invention, the convex mirror 2 is used in place of the plane mirror 16, thereby enabling the Petzval sum produced by the concave mirror 3 to be corrected by the convex mirror 2.

In optical systems represented by the reflecting telephoto lenses as shown in FIGS. 23(a) and 23(b), an opening must be provided in the center of the concave mirror MC as an opening for taking out a bundle of rays. In order to minimize the vignetting of light rays near the edges of visual field that occurs at the opening of the concave mirror MC, the pupil plane must be disposed in the vicinity of the opening of the concave mirror MC. With this arrangement, however, the angle of view is limited by the opening of the concave mirror MC and the aperture of the convex mirror MV, and it is only possible to obtain a view angle of several degrees.

To solve the above problem also, the pupil plane 1 must not be present in the vicinity of the concave mirror 3 or the convex mirror 2 or at a position closer to the image side than the concave mirror 3. In other words, it is essential to dispose the pupil plane 1 at a position closer to the center of curvature of the concave mirror 3.

Further, it is preferable to satisfy the following conditions in order to carry out favorable aberration correction. The following conditional expressions correspond to various aberrations, respectively, and they are independent of each other under conditions of use, e.g., the angle of view, F-number, etc; there is no correlation between the conditional expressions. It may be necessary to satisfy all the conditions, depending upon the use conditions.

First, the relationship between the first and second surfaces 2 and 3 will be explained. Correction of the Petzval sum is particularly important in order to realize favorable aberration correction, as has been described above. In the present invention, it is essential in order to correct the Petzval sum to satisfy the following condition:

$$0.5<|R_1/R_2|<1.8 \quad (2)$$

where $R_1$ is the radius of curvature of the first surface 2, and $R_2$ is the radius of curvature of the second surface 3.

The condition (2) specifies the power distribution to the positive second surface 3 and the negative first surface 2. If $|R_1/R_2|$ is not larger than the lower limit, i.e., 0.5, the balance of aberrations, mainly Petzval sum, corrected by the first and second surfaces 2 and 3 is destroyed, and a large negative Petzval sum is produced. If $|R_1/R_2|$ is not smaller than the upper limit, i.e., 1.8, a large positive Petzval sum is produced, so that it becomes impossible to correct the Petzval sum by another surface.

In a case where it is necessary to comply with the demand for high-definition images as represented by those in high-vision TV in recent years, the Petzval sum must be corrected even more effectively, and it is essential to satisfy the following condition:

$$0.7<|R_1/R_2|<1.7 \quad (6)$$

Next, the second surface 3 will be explained. Assuming that the distance from the pupil plane 1 to the first surface 2 is $D_1$, and the surface separation between the first and second surfaces 2 and 3 is $D_2$, it is preferable to satisfy the following condition:

$$0.4<|(D_1+D_2)/r_2|<1.7 \quad (3)$$

If $|(D_1+D_2)/r_2|$ is not larger than the lower limit, i.e., 0.4, the inclination of the chief ray of emergent light passing through the second surface 3 becomes excessively large, and large negative astigmatism and coma occur. If $|(D_1+D_2)/r_2|$ is not smaller than the upper limit, i.e., 1.7, the amount of negative astigmatism and coma decreases. Consequently, the positive astigmatism and coma produced in the entire lens system undesirably increase because the negative astigmatism and coma are produced to cancel the positive astigmatism and coma produced when the rays pass through the first surface 2.

Further, it is preferable in the present invention that the second surface 3 be concentric. Assuming that the radius of curvature of the first surface 2 is $R_1$, the radius of curvature of the second surface 3 is $R_2$, and the surface separation between the first and second surfaces 2 and 3 is $D_2$, it is preferable to satisfy the following condition:

$$1 < |(R_1 + D_2)/R_2| < 1.8 \qquad (4)$$

The condition (4) must be satisfied in order to enable the coma and astigmatism produced by the second surface 3 to be corrected by the entire system. If $|(R_1+D_2)/R_2|$ is not larger than the lower limit, i.e., 1, the system becomes close to a perfect concentric optical system, so that it becomes impossible to correct the Petzval sum. As a result, a large field curvature occurs. If $|(R_1+D_2)/R_2|$ is not smaller than the upper limit, i.e., 1.8, the angle of incidence of the chief ray on the second surface 3 becomes large, causing the positive comatic aberration to increase. In either case, it becomes impossible to form an image which is clear as far as the edges of visual field.

Further, it is preferable to satisfy the following condition:

$$|D_1/R_1| < 1.5 \qquad (5)$$

where $D_1$ is the distance from the pupil plane 1 to the first surface 2, and $R_1$ is the radius of curvature of the first surface 2.

If $|D_1/R_1|$ is not smaller than the upper limit, i.e., 1.5, the height of the chief ray incident on the first surface 2 undesirably increases, resulting in an increase in the amount of positive coma and astigmatism produced. Consequently, it becomes impossible to form an image which is clear as far as the edges of visual field.

Next, the surface separation will be explained. Assuming that the surface separation between the pupil plane 1 and the first surface 2 is $D_1$, and the focal length of the entire system is F, it is essential to satisfy the following condition:

$$D_1/F < 1.6 \qquad (7)$$

The condition (7) must be satisfied in order to minimize the comatic aberration produced by the first surface 2. If $D_1/F$ is not smaller than the upper limit, i.e., 1.6, the comatic aberration produced by the first surface 2 becomes large, so that it becomes impossible to correct it by another surface. In a case where the optical system of the present invention is used as an ocular optical system, it is essential to satisfy the following condition:

$$0.5 < D_1/F \qquad (8)$$

In the case of an ocular optical system, the condition (8) is concerned with the eye point of an ocular lens. If $D_1/F$ is not larger than the lower limit, i.e., 0.5, the observer's pupil position and the exit pupil position 1 of the ocular optical system are displaced from each other, and it becomes impossible to observe the entire field of view.

Assuming that the surface separation between the first and second surfaces 2 and 3 is $D_2$, it is essential to satisfy the following condition:

$$0.2 < D_2/F < 0.7 \qquad (9)$$

The condition (9) must be satisfied in order to obtain a balance of the Petzval sum produced by the first surface 2 and the Petzval sum produced by the second surface 3. If $D_2/F$ is not smaller than the upper limit, i.e., 0.7, or not larger than the lower limit, i.e., 0.2, the balance of the aberrations produced by the first and second surfaces 2 and 3 is destroyed, resulting in a large difference between the Petzval sums, which should cancel each other substantially.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 11(a) to 11(d) graphically show spherical aberration, astigmatism, distortion and lateral aberration in the first embodiment.

FIGS. 12(a) to 12(d) graphically show various aberrations in the second embodiment in the same way as in FIGS. 11(a) to 11(d).

FIGS. 14(a) to 14(d) graphically show various aberrations in the fourth embodiment in the same way as in FIGS. 11(a) to 11(d).

FIGS. 15(a) to 15(d) graphically show various aberrations in the fifth embodiment in the same way as in FIGS. 11 (a) to 11(d).

FIGS. 16(a) to 16(d) graphically show various aberrations in the sixth embodiment in the same way as in FIGS. 11(a) to 11(d).

FIGS. 17(a) to 17(d) graphically show various aberrations in the seventh embodiment in the same way as in FIGS. 11(a) to 11(d).

FIGS. 18(a) to 18(d) graphically show various aberrations in the eighth embodiment in the same way as in FIGS. 11(a) to 11(d).

FIGS. 19(a) to 19(d) graphically shows various aberrations in the ninth embodiment in the same way as in FIGS. 11 (a) to 11(d).

FIG. 20(a) and 20(b) show an example of an ocular optical system used in a head-mounted display system of the present invention.

FIGS. 23(a) and 23(b) are sectional views each showing a reflecting telephoto lens according to a conventional technique.

DESCRIPTION OF THE PREFERRED EMBODIMENTS

First to ninth embodiments of the optical system according to the present invention will be described below with reference to the accompanying drawings.

Figure 1:
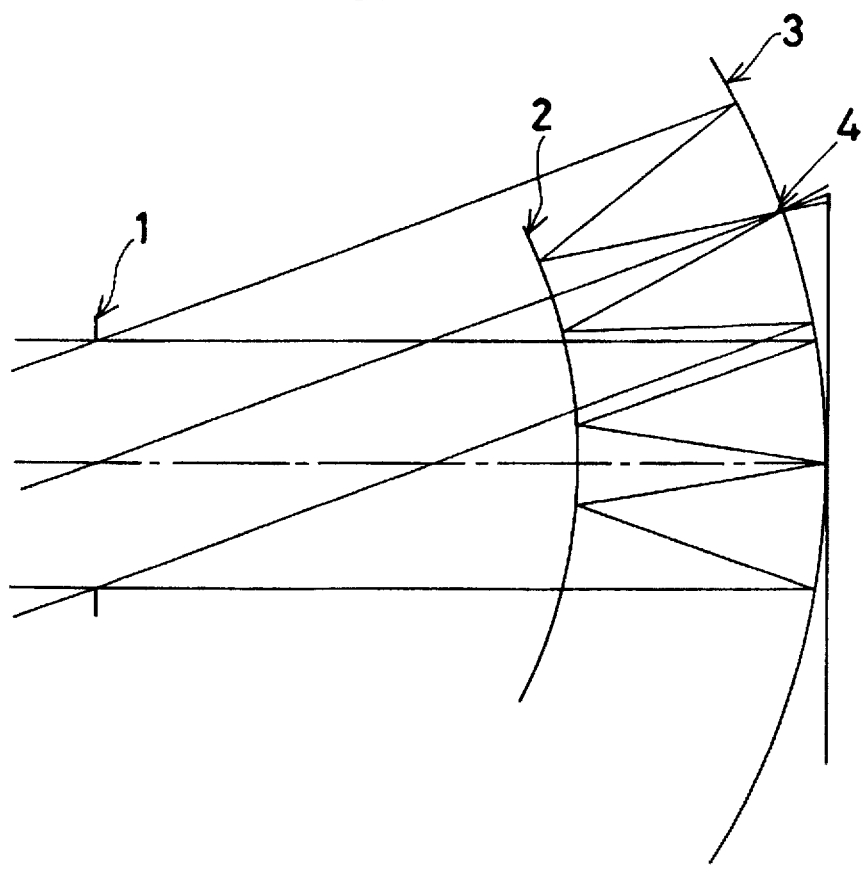
FIG. 1 is a view used to explain the basic arrangement of the optical system according to the present invention and the reason why the amount of aberration occurring in the optical system is small.
Figure 2:
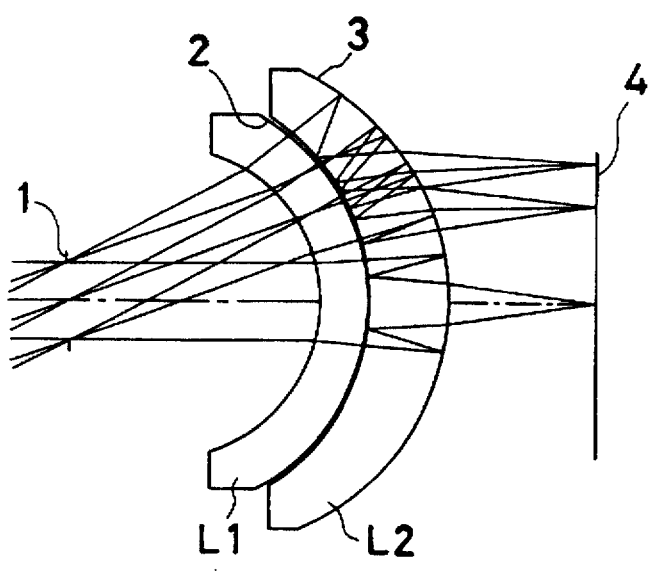
FIG. 2 is a sectional view of a first embodiment of the optical system according to the present invention.

First Embodiment:

A first embodiment of the present invention will be explained below with reference to FIG. 2. In the figure, reference numeral 1 denotes an observer's eyeball (hereinafter referred to as "pupil") position, 2 a first surface, 3 a second surface, and 4 an image surface. In this embodiment, two meniscus lenses L1 and L2 are employed. The convex surface of the meniscus lens L1 is used as the first surface 2, and the convex surface of the meniscus lens L2 is used as the second surface 3. Examples of numerical values in this embodiment are shown below. In the following numerical data, nd denotes the refractive index of lens, and Vd denotes the Abbe's number (the same shall apply hereinafter).

In this embodiment, the angle of view is 45°, the focal length F is 10 mm, and F-number is 3.5.

| Surface No. | Curvature radius | Surface separation | nd | vd |
|---|---|---|---|---|
| 1 | pupil position 1 | 9.158 | | |
| 2 | −5.5382 | 1.624 | 1.5163 | 64.1 |
| 3 | −7.7395 | 0.071 | | |
| 4 | −7.8437 | 2.777 | 1.5163 | 64.1 |
| 5 | −9.1995 (reflecting surface 3) | −2.777 | 1.5163 | 64.1 |
| 6 | −7.8437 | −0.071 | | |
| 7 | −7.7395 (reflecting surface 2) | 0.071 | | |
| 8 | −7.8437 | 2.777 | 1.5163 | 64.1 |
| 9 | −9.1995 | 5.141 | | |
| 10 | image surface 4 | | | |

FIGS. 11(a), 11(b), 11(c) and 11(d) graphically show spherical aberration, astigmatism, distortion and lateral aberration, respectively, in this embodiment.

Figure 3:
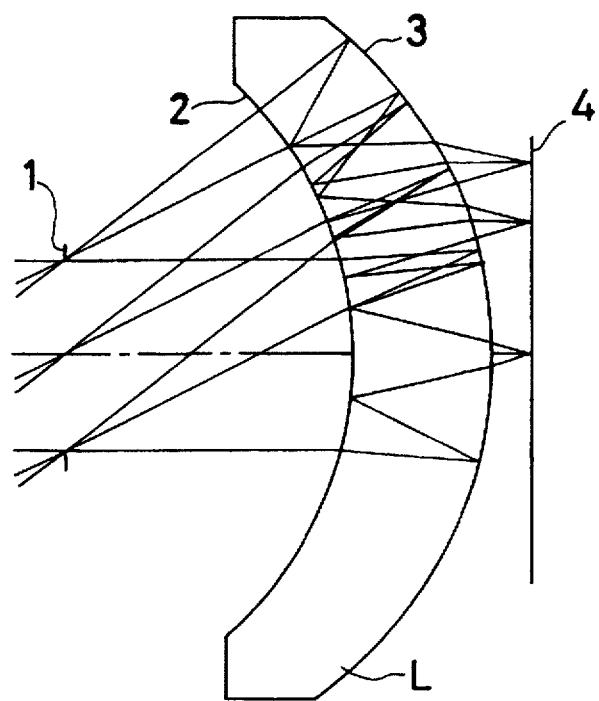
FIG. 3 is a sectional view of a second embodiment of the present invention.

Second Embodiment:

A second embodiment of the present invention will be explained below with reference to FIG. 3. In the figure, reference numeral 1 denotes a pupil position, 2 a first surface, 3 a second surface, and 4 an image surface. In this embodiment, one meniscus lens L is employed, and the concave surface thereof is used as the first surface 2, while the convex surface thereof is used as the second surface 3. Examples of numerical values are shown below. In this embodiment, the angle of view is 60°, the focal length F is 10 mm, and F-number is 1.5.

| Surface No. | Curvature radius | Surface separation | nd | vd |
|---|---|---|---|---|
| 1 | pupil position 1 | 10.130 | | |
| 2 | −13.6165 | 5.239 | 1.5163 | 64.1 |
| 3 | −14.6357 (reflecting surface 3) | −5.239 | 1.5163 | 64.1 |
| 4 | −13.6165 (reflecting surface 2) | 5.239 | 1.5163 | 64.1 |
| 5 | −14.6357 | 1.216 | | |
| 6 | image surface 4 | | | |

FIGS. 12(a) to 12(d) graphically show various aberrations in this embodiment in the same way as in FIGS. 11 (a) to 11(d).

Figure 4:
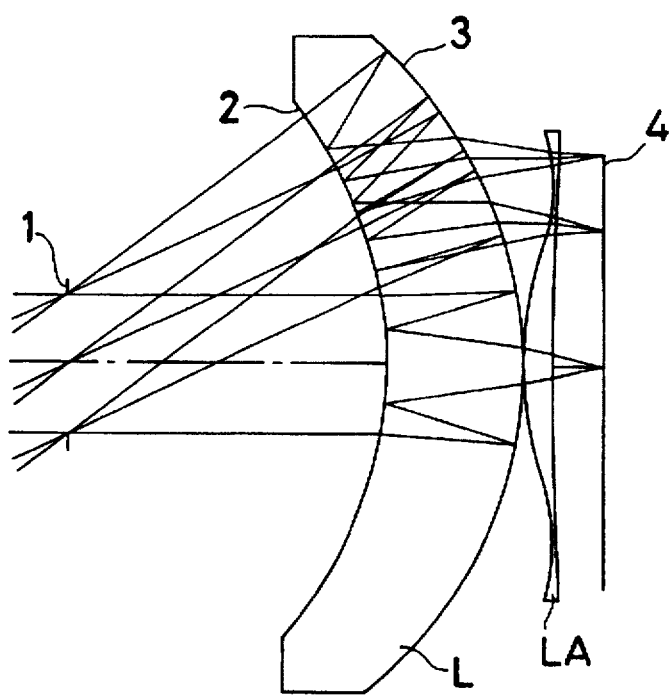
FIG. 4 is a sectional view of a third embodiment of the present invention.

Third Embodiment:

A third embodiment of the present invention will be explained below with reference to FIG. 4. In the figure, reference numeral 1 denotes a pupil position, 2 a first surface, 3 a second surface, and 4 an image surface. In this embodiment, one meniscus lens L is employed, and the concave surface thereof is used as the first surface 2, while the convex surface thereof is used as the second surface 3. In addition, an aspherical lens LA for image distortion correction is disposed at the side of the meniscus lens L which is closer to the image surface 4. Examples of numerical values are shown below. In this embodiment, the angle of view is 60°, the focal length F is 10 mm, and F-number is 2.0.

| Surface No. | Curvature radius | Surface separation | nd | vd |
|---|---|---|---|---|
| 1 | pupil position 1 | 11.423 | | |
| 2 | −14.4225 | 4.817 | 1.5163 | 64.1 |
| 3 | −14.9832 (reflecting surface 3) | −4.817 | 1.5163 | 64.1 |
| 4 | −14.4225 (reflecting surface 2) | 4.817 | 1.5163 | 64.1 |
| 5 | −14.9832 | 0.046 | | |
| 6 | 12.5539 (aspherical surface) K = 0 B = −0.213608 × $10^{-5}$ | 0.914 A = −0.352385 × $10^{-3}$ C = 0 | 1.5163 | 64.1 |
| 7 | 110.7802 | 1.857 | | |
| 8 | image surface 4 | | | |

The above-described aspherical surface is a rotationally symmetric surface expressed by $$Z=(Y^2/R)/[1+\{1-(1+K)(Y/R)^2\}^{1/2}]+AY^4+BY^6+CY^8$$

where R is the paraxial curvature radius; K is a conical constant; and A, B and C are aspherical coefficients.

In the above expression, the direction of propagation of light along the optical axis is taken as Z-axis, and a direction perpendicularly intersecting the optical axis is taken as Y-axis.

FIGS. 13(a) to 13(d) graphically show various aberrations in this embodiment in the same way as in FIGS. 11(a) to 11(d).

Figure 5:
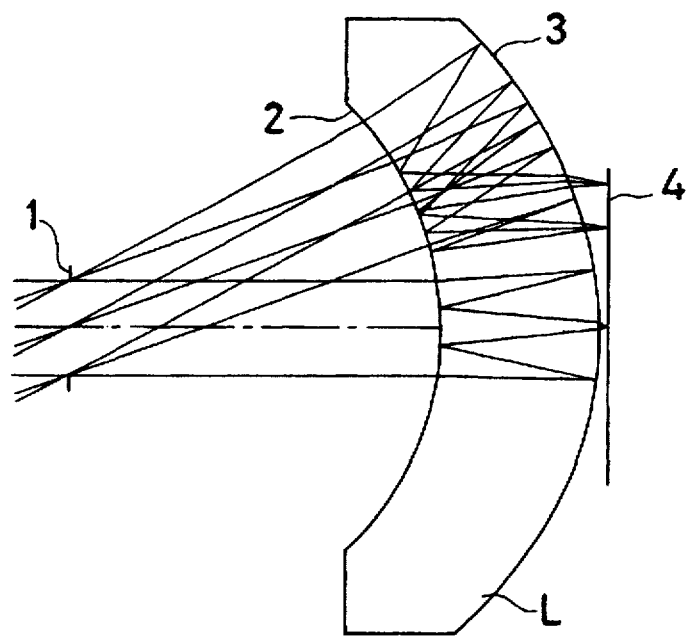
FIG. 5 is a sectional view of a fourth embodiment of the present invention.

Fourth Embodiment:

A fourth embodiment of the present invention will be explained below with reference to FIG. 5. This embodiment is similar to the second embodiment. Examples of numerical values are shown below. In this embodiment, the angle of view is 45°, the focal length F is 10 mm, and F-number is 3.0.

| Surface No. | Curvature radius | Surface separation | nd | vd |
|---|---|---|---|---|
| 1 | pupil position 1 | 13.127 | | |
| 2 | −11.2445 | 5.633 | 1.5163 | 64.1 |
| 3 | −14.0354 (reflecting surface 3) | −5.633 | 1.5163 | 64.1 |
| 4 | −11.2445 (reflecting surface 2) | 5.633 | 1.5163 | 64.1 |
| 5 | −14.0354 | 0.348 | | |
| 6 | image surface 4 | | | |

FIGS. 14(a) to 14(d) graphically show various aberrations in this embodiment in the same way as in 11(a) to 11(d).

Figure 6:
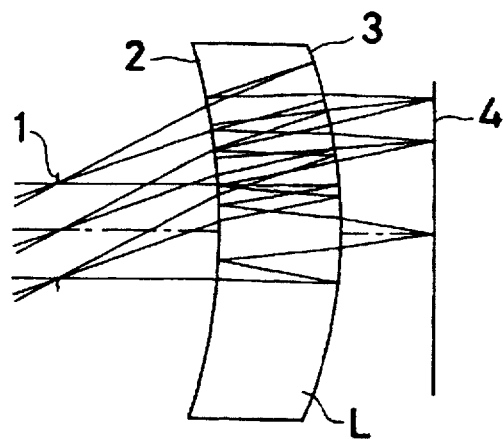
FIG. 6 is a sectional view of a fifth embodiment of the present invention.

Fifth Embodiment:

A fifth embodiment of the present invention will be explained below with reference to FIG. 6. This embodiment is also similar to the second embodiment. Examples of numerical values are shown below. In this embodiment, the angle of view is 45°, the focal length F is 10 mm, and F-number is 3.0.

| Surface No. | Curvature radius | Surface separation | nd | vd |
|---|---|---|---|---|
| 1 | pupil position 1 | 5.805 | | |
| 2 | −24.3790 (reflecting surface 3) | 4.437 | 1.5163 | 64.1 |
| 3 | −17.4632 (reflecting surface 2) | −4.437 | 1.5163 | 64.1 |
| 4 | −24.3790 | 4.437 | 1.5163 | 64.1 |
| 5 | −17.4632 | 3.193 | | |
| 6 | image surface 4 | | | |

FIGS. 15(a) to 15(d) graphically show various aberrations in this embodiment in the same way as in FIGS. 11(a) to 11(d).

Figure 7:
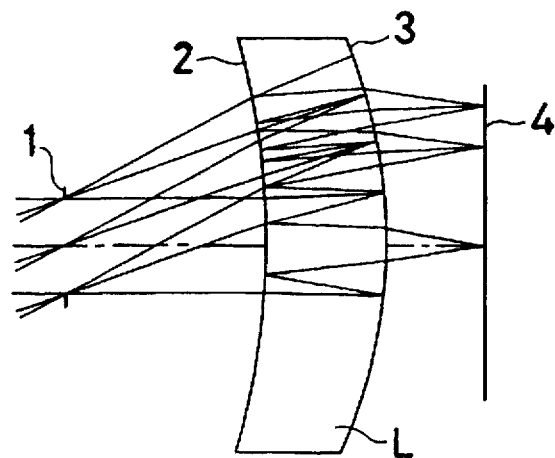
FIG. 7 is a sectional view of a sixth embodiment of the present invention.

Sixth Embodiment:

A sixth embodiment of the present invention will be explained below with reference to FIG. 7. This embodiment is also similar to the second embodiment. Examples of numerical values are shown below. In this embodiment, the angle of view is 45°, the focal length F is 10 mm, and F-number is 3.0.

| Surface No. | Curvature radius | Surface separation | nd | vd |
|---|---|---|---|---|
| 1 | pupil position 1 | 7.259 | | |
| 2 | −27.0911 | 4.287 | 1.5163 | 64.1 |
| 3 | −18.0607 (reflecting surface 3) | −4.287 | 1.5163 | 64.1 |
| 4 | −27.0911 (reflecting surface 2) | 4.287 | 1.5163 | 64.1 |
| 5 | −18.0607 | 3.534 | | |
| 6 | image surface 4 | | | |

FIGS. 16(a) to 16(d) graphically show various aberrations in this embodiment in the same way as in FIGS. 11(a) to 11(d).

Figure 8:
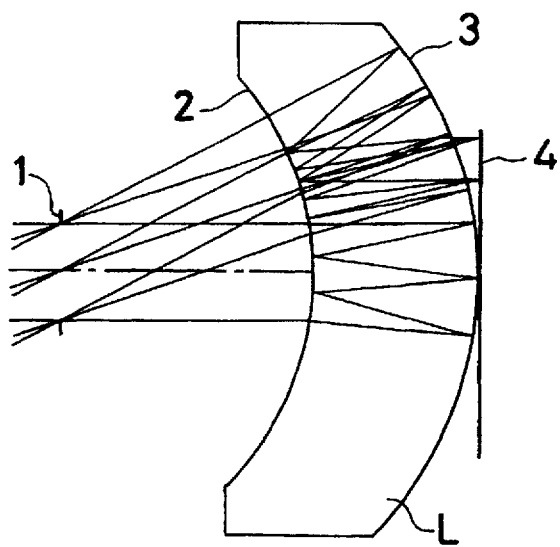
FIG. 8 is a sectional view of a seventh embodiment of the present invention.

Seventh Embodiment:

A seventh embodiment of the present invention will be explained below with reference to FIG. 8. This embodiment is also similar to the second embodiment. Examples of numerical values are shown below. In this embodiment, the angle of view is 45°, the focal length F is 10 mm, and F-number is 3.0.

| Surface No. | Curvature radius | Surface separation | nd | vd |
|---|---|---|---|---|
| 1 | pupil position 1 | 9.152 | | |
| 2 | −10.2521 | 5.711 | 1.5163 | 64.1 |
| 3 | −13.6695 (reflecting surface 3) | −5.711 | 1.5163 | 64.1 |
| 4 | −10.2521 (reflecting surface 2) | 5.711 | 1.5163 | 64.1 |
| 5 | −13.6695 | 0.100 | | |
| 6 | image surface 4 | | | |

FIGS. 17(a) to 17(d) graphically show various aberrations in this embodiment in the same way as in FIGS. 11(a) to 11(d).

Figure 9:
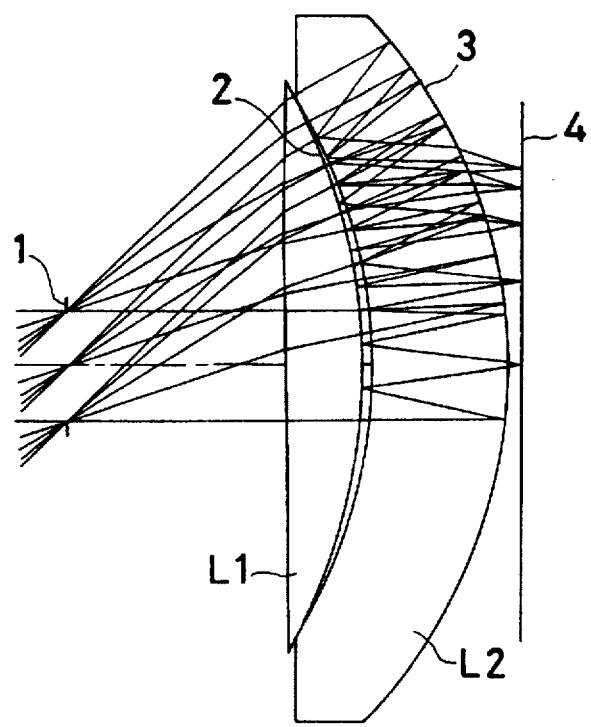
FIG. 9 is a sectional view of an eighth embodiment of the present invention.

Eighth Embodiment:

An eighth embodiment of the present invention will be explained below with reference to FIG. 9. This embodiment is approximately similar to the first embodiment. Examples of numerical values are shown below. In this embodiment, the angle of view is 70°, the focal length F is 10 mm, and F-number is 2.5.

| Surface No. | Curvature radius | Surface separation | nd | vd |
|---|---|---|---|---|
| 1 | pupil position 1 | 8.255 | | |
| 2 | ∞ | 2.813 | 1.5163 | 64.1 |
| 3 | −22.1680 | 0.355 | | |
| 4 | −19.6995 | 5.058 | 1.5163 | 64.1 |
| 5 | −18.7996 (reflecting surface 3) | −5.058 | 1.5163 | 64.1 |
| 6 | −19.6995 | −0.355 | | |
| 7 | −22.1680 (reflecting surface 2) | 0.355 | | |
| 8 | −19.6995 | 5.058 | 1.5163 | 64.1 |
| 9 | −18.7996 | 0.520 | | |
| 10 | image surface 4 | | | |

FIGS. 18(a) to 18(d) graphically show various aberrations in this embodiment in the same way as in FIGS. 11(a) to 11(d).

Figure 10:
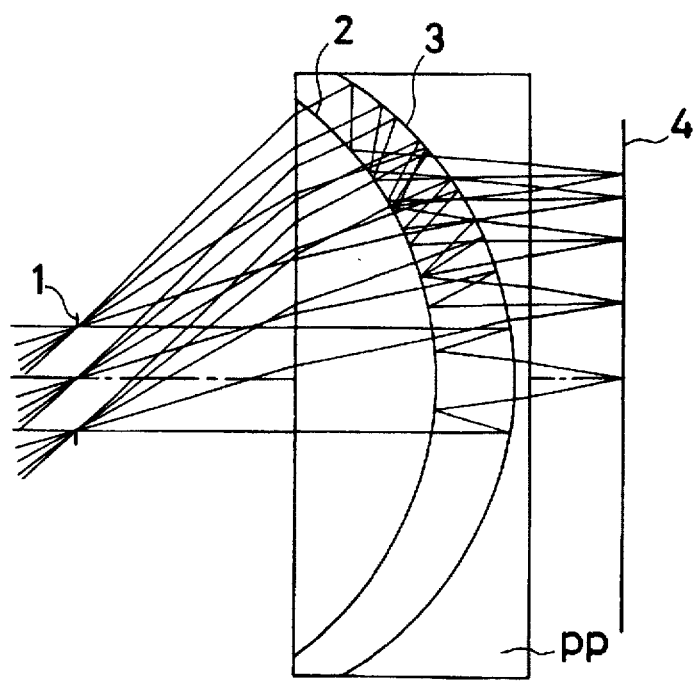
FIG. 10 is a sectional view of a ninth embodiment of the present invention.
Figure 13:
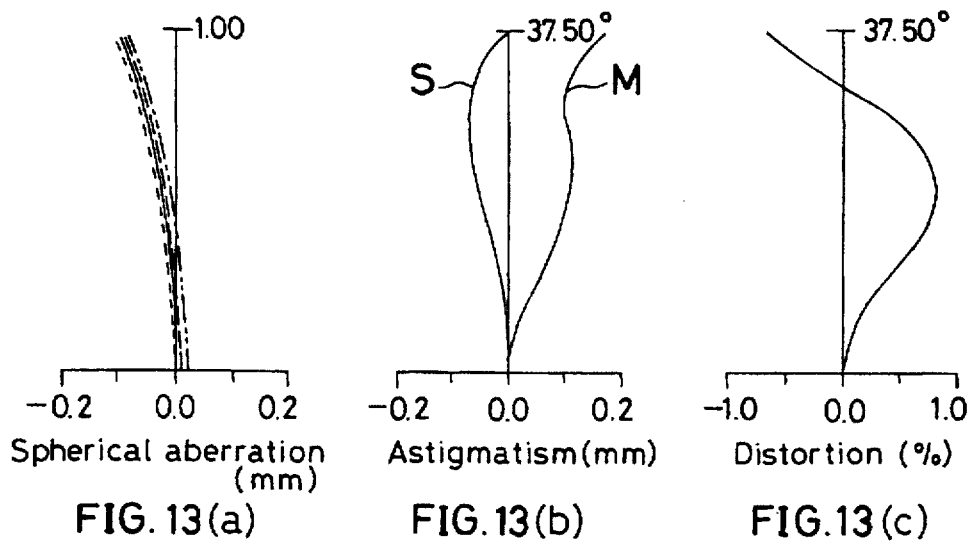
FIGS. 13(a) to 13(d) graphically show various aberrations in the third embodiment in the same way as in FIGS. 11(a) to 11(d).
Figure 13:
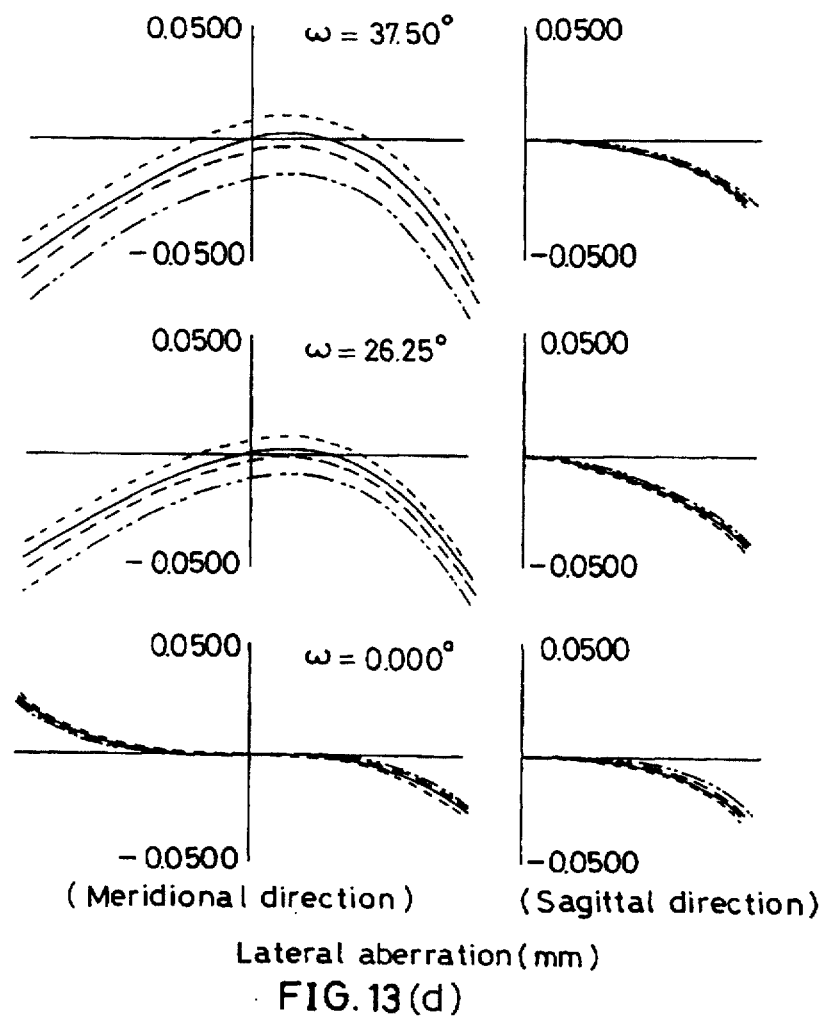
Figure 21:
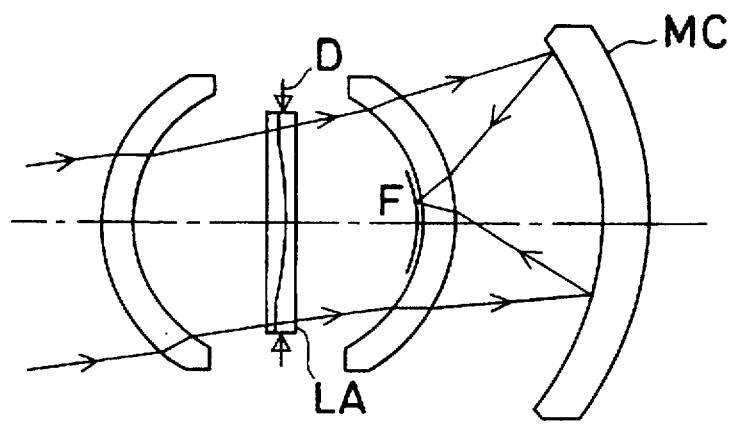
FIG. 21 is a sectional view of a Schmidt system according to a conventional technique.
Figure 22:
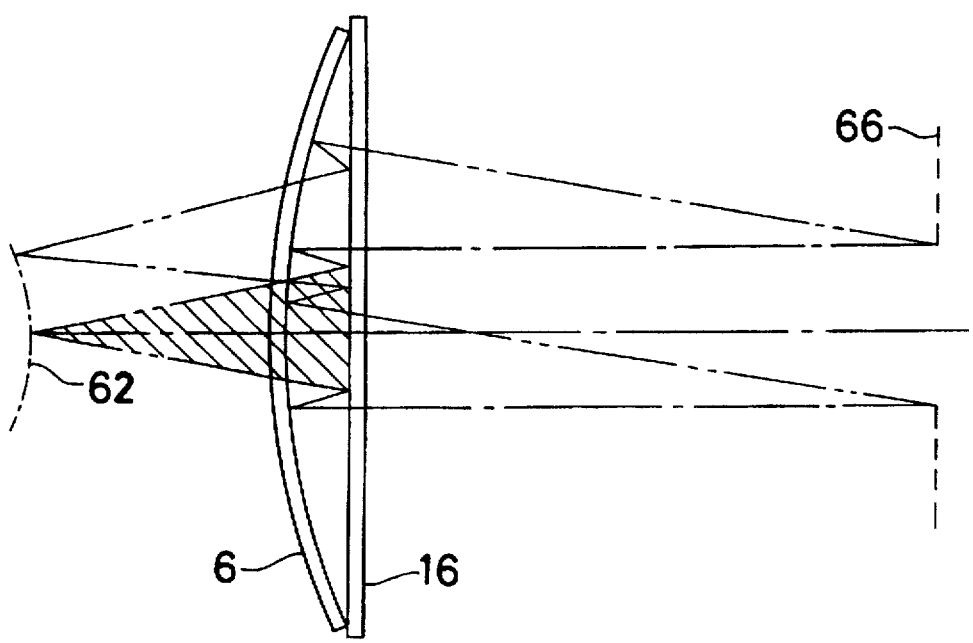
FIG. 22 is a sectional view of an ocular optical system using a semitransparent concave mirror and a semitransparent plane mirror according to a conventional technique.

Ninth Embodiment:

A ninth embodiment of the present invention will be explained below with reference to FIG. 10. In the figure, reference numeral 1 denotes a pupil position, 2 a first surface, 3 a second surface, and 4 an image surface. In this embodiment, the first and second surfaces 2 and 3 are provided in a plane-parallel plate PP having a single refractive index. Examples of numerical values are shown below. In this embodiment, the angle of view is 70°, the focal length F is 10 mm, and F-number is 2.5.

| Surface No. | Curvature radius | Surface separation | nd | vd |
|---|---|---|---|---|
| 1 | pupil position 1 | 8.255 | | |
| 2 | ∞ | 5.426 | 1.5163 | 64.1 |
| 3 | −12.7792 | 2.822 | 1.5163 | 64.1 |
| 4 | −12.9610 (reflecting surface 3) | −2.822 | 1.5163 | 64.1 |
| 5 | −12.7792 (reflecting surface 2) | 3.322 | 1.5163 | 64.1 |
| 6 | ∞ | 3.455 | | |
| 7 | image surface 4 | | | |

FIGS. 19(a) to 19(d) graphically show various aberrations in this embodiment in the same way as in FIGS. 11 (a) to 11(d).

Table below shows values in the foregoing embodiments for the above-described conditions (2) (=(6)), (3), (4), (5), (7) (=(8)), and (9).

| | \multicolumn{6}{c}{Conditions} | | | | | |
|---|---|---|---|---|---|---|
| | (2) | (3) | (4) | (5) | (7) | (9) |
| Embodiment 1 | 0.84 | 1.48 | 1.14 | 1.40 | 1.09 | 0.28 |
| Embodiment 2 | 0.93 | 1.05 | 1.29 | 0.74 | 1.01 | 0.52 |
| Embodiment 3 | 0.99 | 1.27 | 1.28 | 0.99 | 0.92 | 0.27 |
| Embodiment 4 | 0.80 | 1.34 | 1.20 | 1.17 | 1.31 | 0.56 |
| Embodiment 5 | 1.40 | 0.55 | 1.65 | 0.21 | 0.51 | 0.44 |
| Embodiment 6 | 1.50 | 0.64 | 1.74 | 0.27 | 0.73 | 0.43 |
| Embodiment 7 | 0.75 | 1.09 | 1.17 | 0.89 | 0.92 | 0.57 |
| Embodiment 8 | 1.18 | 0.88 | 1.45 | 0.51 | 1.14 | 0.51 |
| Embodiment 9 | 0.99 | 1.27 | 1.20 | 1.07 | 1.37 | 0.28 |

It should be noted that the ocular optical system shown in the present invention may be disposed, for example, in a goggle-type HMD such as that shown in the perspective view of FIG. 20(a).

That is, the ocular optical system may be used, as shown for example in the perspective view of FIG. 20(a), in a head-mounted display system HMD designed so that a virtual image is projected in an eyeball of an observer M as a magnified image, thereby enabling the observer M to view a virtual aerial magnified image. In this case, as shown in the sectional view of FIG. 20(b), an ocular optical system is comprised of a liquid crystal display device LCD for displaying an image, and an ocular optical system ML of the present invention, which is composed of first and second surfaces 2 and 3. The ocular optical system ML is disposed such that the centers of curvature of the first and second surfaces 2 and 3 are directed toward an eye point (pupil position) EP on the observer side, in order to project an image displayed on the liquid crystal display device LCD in the observer's eyeball as a magnified image.

As will be clear from the foregoing description, it is possible according to the present invention to obtain an optical system usable as an ocular optical system, which has an F-number of 1.5 to 3 and enables a flat and clear image to be observed at a view angle of up to 60° or more with substantially no aberration. By using such an optical system, it is possible to provide a head-mounted image display apparatus which enables observation of an image that is clear as far as the edges of visual field at a wide presentation view angle.

What we claim is:

1. A head-mounted image display apparatus comprising:
a device for displaying an image; and
an ocular optical system for leading said image to an observer's eyeball,
said ocular optical system having, in order from the observer's eyeball side, a first surface having a concave surface directed toward the observer's eyeball side, and a second surface having a concave surface directed toward the observer's eyeball side, wherein a medium having a refractive index n larger than 1 (n>1) is disposed between said first and second surfaces,
said image display device having an image surface directed toward at least either one of intersections between an optical axis extending from said observer's eyeball and said first surface and between said optical axis and said second surface, and said image display device being suitable to be disposed in front of an observer's face,
said image display device and said ocular optical system being formed so that a bundle of light rays emitted from said image display device is reflected by said first surface, and the reflected light ray bundle is reflected by said second surface and then passes through said first surface to enter said observer's eyeball, and satisfying the following condition:

$$0.5 < |R_1/R_2| < 1.8$$

wherein $R_1$ is a radius of curvature of said first surface, and $R_2$ is a radius of curvature of said second surface.

2. A head-mounted image display apparatus comprising:
a device for displaying an image; and
an ocular optical system for leading said image to an observer's eyeball,
said ocular optical system having, in order from the observer's eyeball side, a first surface having a concave surface directed toward the observer's eyeball side, and a second surface having a concave surface directed toward the observer's eyeball side, wherein a medium having a refractive index n larger than 1 (n>1) is disposed between said first and second surfaces,
said apparatus further comprising an optical element provided at said second surface side of said ocular optical system, said optical element having a refractive index n larger than 1 (n>1), said image display device being suitable to be disposed in front of an observer's face,
said image display device and said ocular optical system being formed so that a bundle of light rays emitted from said image display device is reflected by said first surface, and the reflected light ray bundle is reflected by said second surface and then passes through said first surface to enter said observer's eyeball, and satisfying the following condition:

$$0.5 < |R_1/R_2| < 1.8$$

wherein $R_1$ is a radius of curvature of said first surface, and $R_2$ is a radius of curvature of said second surface.

3. A head-mounted image display apparatus comprising:
a device for displaying an image; and
an ocular optical system for leading said image to an observer's eyeball,
said ocular optical system having, in order from the observer's eyeball side, a first surface having a concave surface directed toward the observer's eyeball side, and a second surface having a concave surface directed toward the observer's eyeball side, wherein with a medium having a refractive index n larger than 1 (n>1) is disposed between said first and second surfaces,
said image display device having an image surface directed toward at least either one of intersections between an optical axis extending from said observer's eyeball and said first surface and between said optical axis and said second surface, and said image display device being suitable to be disposed in front of an observer's face,
said image display device and said ocular optical system being formed so that a bundle of light rays emitted from said image display device is reflected by said first surface, and the reflected light ray bundle is reflected by said second surface and then passes through said first surface to enter said observer's eyeball, and satisfying the following condition:

$$0.4 < |(D_1+D_2)/R_2| < 1.7$$

where $R_2$ is a radius of curvature of said second surface; $D_1$ is a distance from said observer's eyeball position to said first surface; and $D_2$ is a distance (along a visual axis) from said first surface to said second surface.

4. A head-mounted image display apparatus comprising:

a device for displaying an image; and an ocular optical system for leading said image to an observer's eyeball, said ocular optical system having, in order from the observer's eyeball side, a first surface having a concave surface directed toward the observer's eyeball side, and a second surface having a concave surface directed toward the observer's eyeball side, wherein a medium having a refractive index n larger than 1 (n>1) is disposed between said first and second surfaces, said apparatus further comprising an optical element provided at said second surface side of said ocular optical system, said optical element having a refractive index n larger than 1 (n>1), said image display device being suitable to be disposed in front of an observer's face, said image display device and said ocular optical system being formed so that a bundle of light rays emitted from said image display device is reflected by said first surface, and the reflected light ray bundle is reflected by said second surface and then passes through said first surface to enter said observer's eyeball, and satisfying the following condition:

$$0.4 < |(D_1+D_2)/R_2| < 1.7$$

where $R_2$ is a radius of curvature of said second surface; $D_1$ is a distance from said observer's eyeball position to said first surface; and $D_2$ is a distance (along a visual axis) from said first surface to said second surface.

5. A head-mounted image display apparatus comprising:

a device for displaying an image; and an ocular optical system for leading said image to an observer's eyeball, said ocular optical system having, in order from the observer's eyeball side, a first surface having a concave surface directed toward the observer's eyeball side, and a second surface having a concave surface directed toward the observer's eyeball side, wherein with a medium having a refractive index n larger than 1 (n>1) is disposed between said first and second surfaces, said image display device having an image surface directed toward at least either one of intersections between an optical axis extending from said observer's eyeball and said first surface and between said optical axis and said second surface, and said image display device being suitable to be disposed in front of an observer's face, said image display device and said ocular optical system being formed so that a bundle of light rays emitted from said image display device is reflected by said first surface, and the reflected light ray bundle is reflected by said second surface and then passes through said first surface to enter said observer's eyeball, and satisfying the following condition:

$$1 < |(|R_1|+D_2)/R_2| < 1.8$$

where $R_1$ is a radius of curvature of said first surface; $R_2$ is a radius of curvature of said second surface; and $D_2$ is a distance from said first surface to said second surface along an observer's visual axis.

6. A head-mounted image display apparatus comprising:

a device for displaying an image; and an ocular optical system for leading said image to an observer's eyeball, said ocular optical system having, in order from the observer's eyeball side, a first surface having a concave surface directed toward the observer's eyeball side, and a second surface having a concave surface directed toward the observer's eyeball side, wherein a medium having a refractive index n larger than 1 (n>1) is disposed between said first and second surfaces, said apparatus further comprising an optical element provided at said second surface side of said ocular optical system, said optical element having a refractive index n larger than 1 (n>1), said image display device being suitable to be disposed in front of an observer's face, said image display device and said ocular optical system being formed so that a bundle of light rays emitted from said image display device is reflected by said first surface, and the reflected light ray bundle is reflected by said second surface and then passes through said first surface to enter said observer's eyeball, and satisfying the following condition:

$$1 < |(|R_1|+D_2)/R_2| < 1.8$$

where $R_1$ is a radius of curvature of said first surface; $R_2$ is a radius of curvature of said second surface; and $D_2$ is a distance from said first surface to said second surface along an observer's visual axis.

7. A head-mounted image display apparatus comprising:

a device for displaying an image; and an ocular optical system for leading said image to an observer's eyeball, said ocular optical system having, in order from the observer's eyeball side, a first surface having a concave surface directed toward the observer's eyeball side, and a second surface'having a concave surface directed toward the observer's eyeball side, wherein with a medium having a refractive index n larger than 1 (n>1) is disposed between said first and second surfaces, said image display device having an image surface directed toward at least either one of intersections between an optical axis extending from said observer's eyeball and said first surface and between said optical axis and said second surface, and said image display device being suitable to be disposed in front of an observer's face, said image display device and said ocular optical system being formed so that a bundle of light rays emitted from said image display device is reflected by said first surface, and the reflected light ray bundle is reflected by said second surface and then passes through said first surface to enter said observer's eyeball, and satisfying the following condition:

$$|D_1/R_1| < 1.5$$

where $R_1$ is a radius of curvature of said first surface, and $D_1$ is a distance from said observer's eyeball to said first surface.

8. A head-mounted image display apparatus comprising:

a device for displaying an image; and an ocular optical system for leading said image to an observer's eyeball, said ocular optical system having, in order from the observer's eyeball side, a first surface having a concave surface directed toward the observer's eyeball side, and a second surface having a concave surface directed toward the observer's eyeball side, wherein a medium having a refractive index n larger than 1 (n>1) is disposed between said first and second surfaces, said apparatus further comprising an optical element provided at said second surface side of said ocular optical system, said optical element having a refractive index n larger than 1 (n>1), said image display device being suitable to be disposed in front of an observer's face, said image display device and said ocular optical system being formed so that a bundle of light rays emitted from said image display device is reflected by said first surface, and the reflected light ray bundle is reflected by said second surface and then passes through said first surface to enter said observer's eyeball, and satisfying the following condition:

$$|D_1/R_1|<1.5$$

where $R_1$ is a radius of curvature of said first surface, and $D_1$ is a distance from said observer's eyeball to said first surface.

* * * * *